US007684083B2

(12) United States Patent
Robles-Flores

(10) Patent No.: US 7,684,083 B2
(45) Date of Patent: Mar. 23, 2010

(54) SYSTEMS AND METHODS FOR ENHANCING IMAGES PRODUCED IN IMAGE FORMING DEVICES WITH BACKGROUND ADJUSTMENT MATERIALS DEPOSITED BASED ON CHARACTERISTIC OF IMAGE RECEIVING MEDIUM

(75) Inventor: Eliud Robles-Flores, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 504 days.

(21) Appl. No.: 11/749,442

(22) Filed: May 16, 2007

(65) Prior Publication Data

US 2008/0285876 A1 Nov. 20, 2008

(51) Int. Cl.
*H04N 1/23* (2006.01)
*G03G 15/00* (2006.01)

(52) U.S. Cl. ...................... 358/1.9; 358/3.24; 358/3.27; 399/45; 399/390

(58) Field of Classification Search .................. 358/1.9, 358/3.24, 3.26, 3.27, 501, 504, 401, 406, 358/296, 300; 399/45, 23, 381, 389, 390; 347/153, 262
See application file for complete search history.

(56) References Cited

U.S. PATENT DOCUMENTS 7,280,242 B2 * 10/2007 Hobbs ........................ 358/1.9
7,483,158 B2 * 1/2009 Hayashihara .............. 358/1.12
7,546,080 B2 * 6/2009 Tanaka et al. ................. 399/45
2004/0183880 A1 * 9/2004 Kito ............................ 399/45
2008/0239404 A1 * 10/2008 Kawasaki et al. .......... 358/3.28
2009/0232528 A1 * 9/2009 Togami ....................... 399/45

* cited by examiner

*Primary Examiner*—Scott A Rogers
(74) *Attorney, Agent, or Firm*—Oliff & Berridge, PLC

(57) ABSTRACT

An image forming device is provided that facilitates enhanced image on an output image receiving medium based on one or more sensed or user-input characteristics of the output image receiving medium. A very light uniform toner dust layer is distributed over an entire page to be printed (including image and non-image areas), or in intended non-image areas particularly along edges of a lightweight output image receiving medium. A programmable selection of a color or other parameters of toner dusting, from a plurality of choices, is undertaken such that toner presence in non-image areas is not visually perceptible. The system may effectively print over a variety of background colors. An effective and simple user interface provides an option to the user to choose appropriate low perceptibility toner color so that a relatively higher level of the chosen color may be deposited without crossing a perceptibility threshold.

30 Claims, 2 Drawing Sheets

SYSTEMS AND METHODS FOR ENHANCING IMAGES PRODUCED IN IMAGE FORMING DEVICES WITH BACKGROUND ADJUSTMENT MATERIALS DEPOSITED BASED ON CHARACTERISTIC OF IMAGE RECEIVING MEDIUM

BACKGROUND

This disclosure is directed to systems and methods for improving produced and/or reproduced images deposited on output image receiving media in image forming devices.

Image forming devices are necessary productivity tools for producing and/or reproducing documents in ever-broadening applications in business and personal uses. With the proliferation of image forming devices, a requirement for processing very complex image data in order to produce and/or reproduce higher-quality images on virtually any image receiving medium has arisen. Characteristics of various image receiving media that may affect output image quality, requiring adjustment within image forming devices, include variations in medium thickness, quality, and composition, and wide variance in the content of the materials from which various image receiving media are formed. The requirement for a specific image forming device to be able to accommodate image receiving media of varying characteristics without degradation in produced and/or reproduced image quality is an imperative. Varying technologies are available to address image quality levels as they relate to varying characteristics in image receiving media.

A specific example to highlight the need to be able to adjust print characteristics to characteristics associated with a particular output image receiving medium regards printing on a lightweight output image receiving media.

Printing on lightweight media is a commercial necessity in order to produce books, magazines and other forms of documents that can be maintained at archives and in libraries in an economized storage space. The use of lighter weight i.e., reduced thickness, image receiving media may advantageously result in a number of benefits including an overall cost reduction associated with, for example, shipping and storing printed materials associated with such media, among others.

Particularly in electrostatic image forming devices, when printing on lightweight output image receiving media, characteristics of the individual receiving medium can have significant effect on the image quality of the processed output image in the image forming device. Among the characteristics that are particularly acute when dealing with lightweight output image receiving media are, for example, moisture content and an ability to maintain adherence of the lightweight output image receiving medium, for example, to image receiving media handling paths within the image forming device in order to attempt to ensure that the lightweight output image receiving medium, for example, fully conforms to the photoreceptor device. In this regard, particularly with respect to lightweight output image receiving media, it is necessary to ensure a flattening of the lightweight output image receiving media to provide proper support for the transfer process. Lightweight output image receiving media distorts very easily, and more so, for example, when it has been exposed to moisture. Such distortion may render an individual lightweight output image receiving medium very difficult to accurately deposit an output image on without at least some distortion in the output image. Additionally, given the presence of electrostatic forces between the lightweight output image receiving medium and the photoreceptor surface, individual sheets of lightweight output image receiving medium have difficulty in sliding smoothly to conform precisely to the surface of the photoreceptor. In order to improve the quality of produced and/or reproduced output image deposition on, for example, lightweight output image receiving media, therefore, flattening is essential.

In applications like lightweight media printing (LWP), the flatness of the media is highly sensitive to the environmental conditions. Due to high ambient temperature and humidity, the LWP media absorbs moisture at a high rate and tends to ripple or buckle around the edges. The image formation process with respect to such LWP media is therefore, compromised. This is particularly true if the LWP medium is exposed to an environment >55 GOW, which is a combination of high temperature (>70 deg. F.) and a high relative humidity (>55%), over a period of time exceeding several hours. When LWP media, in that state, is fed to a machine and is moving through the transfer zone, high tacking forces at the lead edge are imparted by transfer process current. Those tacking forces are further exacerbated by voltage levels in non-imaged areas due to the cleaning fields that the control system must operate at depending on the material conditions. The higher the tacking force, the less able the media is to move around, yield to transfer assist blade (TAB) force to flatten ripples, and fully conform to the photoreceptor device. Because the LWP medium is not able to conform to photoreceptor device, the non-uniformities in the LWP medium will end up appearing as deletions in the body of the LWP medium.

Other effects of the electrostatic image forming process are that when the lightweight output image receiving medium, particularly in high moisture content environments resulting in elevated moisture absorption tending to ripple and/or buckle around the edges, is moving through the transfer zone in an electrostatic image forming device, high tacking forces at the lead edge are imparted by the transfer process current. Those tacking forces may be further increased by voltage levels in non-imaged areas due to a number of effects, such as, for example, the relative strength of a cleaning field that the control system of the electrostatic image forming device introduces based on material conditions. Elevated tacking forces at the edges result in particularly lightweight output image receiving media being unable to conform to the appropriate surfaces in the image receiving media handling paths within the image forming device. As such, formed ripples and/or buckles are not afforded an opportunity to be flattened in order that the output image receiving medium can filly conform to the contours of the photoreceptor device. If such an output image receiving medium is not able to conform to the contours of the photoreceptor device, ripples and non-uniformities in the output image receiving medium will tend to gather and merge together creating potentially large deletions in the body of the medium. Such deletions may most predominantly appear as a single main deletion area in the center of the individual sheet of output image receiving medium. Any distortion in the output image receiving medium will, therefore, tend to result in reduced image quality in the images produced and/or reproduced by the image forming device.

SUMMARY

In view of the above difficulties, flattening of any output image receiving medium, particularly with respect to conformity to the photoreceptor device in electrostatic image forming devices, is advantageous. The advantages of such flattening are particularly acute given the specific characteristics of a lightweight output image receiving medium. Flattening of output image receiving the media to provide proper support during the transfer process is not, however, easily accomplished.

In view of the above discussion, it would be advantageous to provide systems and methods to enhance the ability of an image forming device to autonomously adjust image forming and/or deposition conditions, based on the characteristics of an output image receiving medium, to enhance the ability of the image forming device to promote higher output image quality. One example of a characteristic that could be adjusted for involves flattening of an output image receiving medium with respect to the output image receiving media handling path in an effort to promote conformity to the photoreceptor device during the transfer process.

As a specific effect observed commonly, any ripples and non-uniformities in, for example, LWP media will tend to gather and merge together creating large deletions in the body of the LWP media. Most predominantly, this effect may be shown as a single main deletion in the center of the LWP medium.

In various exemplary embodiments, the systems and methods according to this disclosure may provide an ability to optimize an image producing and/or reproducing capability in an image forming device, with an objective of enhancing output image quality, where such optimization is based on at least one characteristic specifically associated with the output image receiving medium on which the image is to be formed.

In various exemplary embodiments, the systems and methods according to this disclosure may provide an enhanced capability by which an output image receiving medium can be flattened in the image receiving media handling paths of an image forming device in order to promote enhanced image quality in the output images formed on the output image receiving medium.

In various exemplary embodiment, the systems and methods according to this disclosure may provide an ability to enhance flattening of particularly a lightweight output image receiving medium in the transfer zone of an electrostatic image forming device in order to increase conformity of the lightweight output image receiving medium, upon which an image is to be formed, with the photoreceptor device in an electrostatic image forming device.

In various exemplary embodiments, the systems and methods according to this disclosure may provide a particular capability by which flattening can be enhanced in, for example, lighter weight output image receiving media. Such lightweight output image receiving media are recognized as being particularly susceptible to moisture absorption and attendant rippling and/or buckling. The systems and methods according to this disclosure may be particularly adapted to enhanced flattening of such LWP media particularly where it is recognized that large deletion areas may occur absent an ability to flatten such LWP media.

In various exemplary embodiment, the systems and methods according to this disclosure may provide an ability to deposit, on an image receiving medium, a uniform toner layer across an entire sheet of output image receiving medium, including, for example, both intended image receiving areas and intended non-image receiving areas. In this manner, the systems and methods according to this disclosure, by providing a light toner dusting in, for example, non-image areas, commonly referred to as background areas, may enhance flattening, and therefore, image quality with respect to particularly lightweight output image receiving media. It should be recognized and appreciated that such a dusting of toner across an entire sheet of output image receiving medium, or even in only intended non-image areas, particularly along a leading edge or at a plurality of edges of the image receiving medium, will tend to reduce tacking forces. This reduction may be based on two separate, but related, physical mechanisms. First, such a light dusting of toner particles in non-imaged areas will tend to provide a mechanical lubrication effect in which the toner particles tend to act as, for example, ball bearings, rendering the surface of the output image receiving media more malleable for conformity to the photoreceptor device. Second, such a dusting of toner particles in non-imaged areas may produce a significant degradation or reduction in the electrostatic attractive forces acting on the output image receiving medium, particularly along toner dusted edges. In other words, the presence of low charge and/or neutral toner across an entire surface of an output image receiving medium will tend to degrade electrostatic forces.

In various exemplary embodiments, the systems and methods according to this disclosure may provide an ability to cover an entire sheet of output image receiving media with a dusting of toner that is visually imperceptible thereby enhancing image quality without degrading the background.

An advantage of the systems and methods according to this disclosure, over, for example, manipulating an ability to flatten an output image receiving medium by implementing the control system in the electrostatic image forming device to lower voltages in the transfer zone, is that the systems and methods according to this disclosure are adaptable to virtually any electrostatic image forming device. The systems and methods according to this disclosure may be implemented to be end-user enabled and/or implemented based on modification, for example, of toner reproduction curves within the electrostatic image forming device. As such, the control system is not constrained to attempt to modify voltages based on characteristics associated with any specific and changeable output image receiving medium. Although an operating point of an electrostatic image forming device may be adjusted to lower ROS-Vmc providing a relatively higher background toner concentration, selecting an appropriate color depth scale, modified by a % area coverage (% AC) does not force the image forming device to an operating point that may be non-optimum for image production and/or reproduction thereby constraining the control space of the device. Rather, it can be applied consistently, is able to be molded to be end-user enabled, nay produce a more stable background response, and does not constrain the control space in the process.

These and other features and advantages of the disclosed systems and methods are described in, or apparent from, the following detailed description of embodiments.

BRIEF DESCRIPTION OF THE DRAWINGS

Various exemplary embodiments of disclosed systems and methods for enhancing image quality, in an image forming device will be described, in detail, with reference to the following drawings, wherein.

DETAILED DESCRIPTION OF EMBODIMENTS

Figure 1:
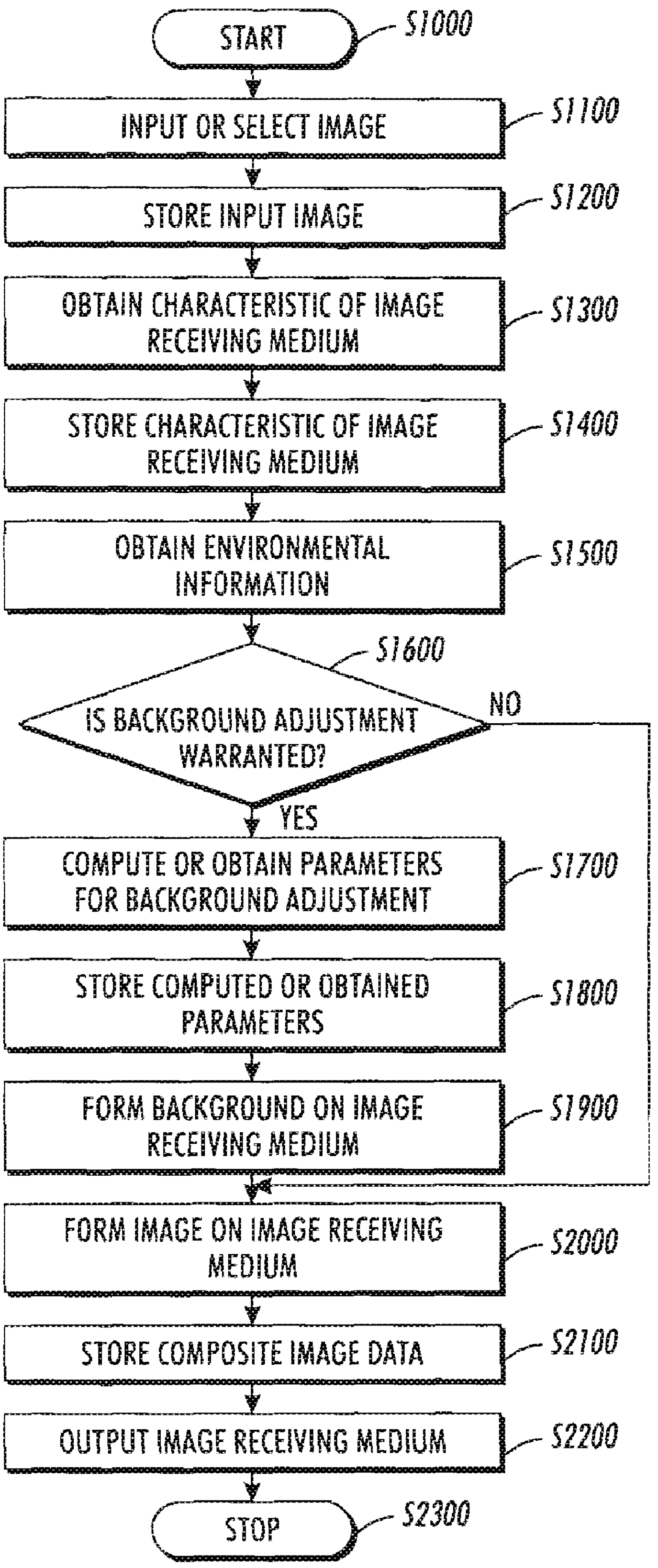
FIG. 1 illustrates a flowchart of a method for improving image formation on an output image receiving medium in an image forming device based on a characteristic of the output image receiving medium.

The following description of various exemplary embodiments of systems and methods for improving image quality with regard to output image produced on various image receiving media in image forming devices may refer to electrostatically forming output images on lightweight output image receiving media or lightweight printing (LWP) media. Key objectives of such systems and methods may be to attempt to produce a more stable background response even in conditions where the image forming device is operated in an environment where elevated temperatures and relative humidities prevail to improve the image quality (IQ) of an image disposed on LWP (for example, such LWP with a characteristic <=60 gsm with uncoated finish or <=90 gsm with coated finish) under highly sensitive environmental conditions such that perturbations or distortions in the output image are reduced or eliminated. Common perturbations including deletions, area specific fading and uneven quality of the formed output image may be among those that are sought to be addressed. For example, in conditions where a lightweight output image receiving medium has been stored under the above-described environmental conditions over a sufficiently long duration of time that the medium may have absorbed moisture at a high rate, further degrading an ability to accept and produce and/or reproduce image data on the media without deletion, the systems and methods according to this disclosure may be employed to correct for such a shortcoming in the storage of the output image receiving media. While the above example of a specific implementation may be referred to for clarity, and ease of depiction and description, it should be appreciated that the systems and methods according to this disclosure are not limited to any specific application. Although the systems and methods according to this disclosure may be particularly adapted to image formation and electrostatic image forming devices, virtually any image forming system in which characteristics of a particular image receiving media may be sensed and an adjustment of the deposition of an image forming substance such as, for example, a toner or an ink, that may advantageously affect the image receiving medium to facilitate higher image quality is contemplated.

As will be described in detail below, the systems and methods according to this disclosure may deposit toner particles, not associated with image production, across at least a portion of an output image receiving medium. The systems and methods according to this disclosure may be particularly advantageous in disposing a substantially uniform toner field, which may be visually imperceptible, at least in non-image areas, commonly referred to as background areas, on an image receiving medium to adjust the image receiving environment of the image receiving medium based on characteristics of the image receiving medium.

Such adjustments may, for example, be undertaken with respect to tacking forces associated with electrostatic image formation on an image receiving medium due to a combination of two mechanisms. First, mechanical lubrication may be achieved by the toner particle serving essentially as ball bearings allowing for manipulation of particularly a lightweight image receiving medium in order to be able to conform to the photoreceptor device. Second, electrostatic degradation may be achieved due to the presence of low charge and/or neutral toner degrading such electrostatic forces as may act upon the image receiving medium. The deposition of a substantially uniform toner field, particularly in non-image areas on an output image receiving medium is intended to be accomplished by any one of number of systems and methods within an image forming device. These methods, as will be described in more detail below, may include using digital front end (DFE) tools to manipulate user toner reproduction curves (userTRC) such that the light toner dusting can be applied to every image forming process consistently and without constraining the control system of the image forming device. Alternatively, the DFE may be modified in order to operate the electrostatic image forming device in a manner to produce a low cleaning field.

A toner dust of appropriate color, selected based on the color of the non-image area, when deposited in the background, can aid in limiting deletions in image areas, particularly when a lightweight output image receiving medium is printed upon. It may also be preferable, in order to avoid degrading the image, that the toner dust intensity be retained at a level that is visibly imperceptible. For an example, one such less perceptible color is yellow. A plurality of choices of toner dust color may be provided. That is because the perceptibility of toner dust of a specific color may change as the background (non-image area) color changes. Any low-perceptibility color may be chosen such that relatively higher level of the chosen color than other colors may be deposited without crossing the perceptibility threshold. Using a less perceptible color such as yellow to enable this low level of background opens up latitude for a more stable solution in that the device can deposit higher levels of yellow than other colors without crossing the perceptibility threshold. On similar lines, for a printing background to be other than white, appropriate toner dust color may be selected. For example, if printing on red stock, magenta can be used instead of yellow.

FIG. 1 illustrates a flowchart of a method for improving image formation on an output image receiving medium in an image forming device based on a characteristic of the output image receiving medium. As shown in FIG. 1 operation and method commences at step S1000 and proceeds to step S1100.

In step S1100, an input image is obtained. It should be appreciated that the input image may be obtained by being input to the image forming device via, for example, any manner of scanner device associated with the image forming device, or the input image may already be stored in, for example, some manner of image production and/or reproduction device such as, for example, a computer or computer workstation connected by a network, some image data exchange pathway, such as, for example, to the image forming device. Operation of a method continues directly to step S1300, or optionally to step S1200.

In optional step S1200, particularly in a case where an input image is input from, for example, a scanner device in an image forming device, such input image information, or data related to the scanned input image, may be stored in one or more storage devices located within, or associated with, the image forming device. Operation of the method continues to step S1300.

In step S1300, one or more characteristics related to the output image receiving medium on which the input image is to be produced and/or reproduced is obtained. It should be appreciated that such obtaining of a characteristic of the output image receiving medium may comprise, for example, requesting from a user some predetermined, or on-call, input characteristic field to be input by the user via, for example, a graphical user interface associated with the image forming device. Alternatively, a characteristic of the output image receiving medium, may be sensed by one or more sensors associated with, for example, a holding portion, such as, for example, a tray in which a set of a plurality of output image receiving media may be held, or any manner of sensor, for example, within an image media handling or transport system located within, or associated with, the image forming device.

Such characteristics of the output image receiving medium may include, for example, a color, texture, thickness, material of which the output image receiving medium is constituted, or any other like characteristic which may affect image formation on the output image receiving medium due to deviations and/or distortions that may be introduced because the image receiving medium is of a lightweight nature, i.e., reduced thickness. Operation of the method may proceed directly to step S1600, or optionally to one of step S1400 or step S1500.

In optional step S1400, obtained characteristic information, whether sensor obtained, and/or user input, may be optionally stored to any beneficial purpose. Such beneficial purpose includes but is not limited to, providing, for example, an ability of the image forming device not to require, on a repeated basis, characteristic information regarding an output image receiving medium stored in, for example, an input tray, the characteristics of which remain stable over time. Operation of a method may continue directly to step S1600 or to optional step S1500.

In optional step S1500, environmental information such as, for example, temperature and/or humidity that may add to, or otherwise complement or supplement, the characteristic information regarding the output image receiving medium in the image forming device in order to determine whether the output image receiving medium may be prone to deviations and/or distortions may be obtained. It should be appreciated that, as output image receiving media become lighter and thinner in weight and mass, particularly relative humidity of the areas in which the output image receiving media is stored and/or employed may have more significantly adverse effects on the ability of the output image receiving media to receive an image formed thereon without distortion. As such, it may be important, given certain characteristics of the output image receiving media, particularly those related to thickness and/or weight (or more specifically stiffness as measured by bending moment of the medium) of the output image receiving media, to be particularly aware of environmental conditions such as, for example, at least relative humidity and overall temperature to which the lightweight output image receiving media is exposed during storage and/or use. This is particularly very important in two common (but not limiting) scenarios: 1) if the image forming device does not contain output image receiving media conditioners in feeder modules (to maintain optimum relative humidity while media is waiting to be fed) hence exposing output image receiving media to unstable room environment and 2) output image receiving media is not handled properly and is left out to acclimate to unstable room environments. Operation of a method continues to step S1600.

In step S1600, a determination is made whether, based on the characteristics of the output image receiving medium, environmental conditions, or other conditions which may be preset in the image forming device, or which a user may input to the image forming device, a background adjustment may be warranted to facilitate improved image formation. If, in step S1600, a determination is made that automated background adjustment is not warranted, operation of the method continues directly to step S2000.

If, in step S1600, a determination is made, based on any of the above-identified characteristics, or otherwise, that background adjustment is warranted, or would be beneficial, operation of the method may continue directly to step S1900, or optionally to one of step S1700 or step S1800.

In optional step S1700, parameters for the adjustment of a background may be obtained and/or computed. Such obtaining may be based on a set of pre-stored parameters regarding adjustments to, for example, a toner reproduction curve within the image forming device, or other manipulation of the digital front end of the image forming device to, for example, adjust the intensity of a cleaning field to a lower level. An objective of any such adjustment may be to provide a light toner dusting to a part or all of a surface of the output image receiving medium, particularly in non-image areas of the output receiving medium. Alternatively, the system may through, for example, a graphical user interface, request user input for adjustment of, for example, a user-adjustable parameter regarding the toner reproduction curves and/or user manipulation of the DFE to modify the cleaning field intensity in the image forming device.

Regardless of the manner by which background adjustment parameters may be computed and/or obtained, an objective of providing such a background dusting is to optimize the background with respect to the output image receiving medium, adjusted as necessary for the environment within which the output image receiving medium was stored, or is being employed, to enhance image quality in the images produced on the output image receiving medium. Operation of the method may continue directly to step S1900, or alternately to optional step S1800.

In optional step S1800, computed and/or obtained parameters for adjusting a background of a toner field to be deposited on an output image forming device may be stored to some beneficial purpose. Such beneficial purpose may include, for example, establishing, populating and/or updating a database of parameters that may be provided to correspond to characteristics of routinely employed output image receiving media for the specific image forming device. In this regard, based on, for example, one of sensed or input characteristics of an output image receiving medium currently being employed by the image forming device to produce output images thereon, the system may automatically query such a database in order to obtain predetermined and/or recently updated parameters regarding compatible background toner deposition. Operation of the method continues to step S1900.

In step S1900, a light toner dusting based on computed and/or obtained characteristics of, for example, the output image receiving medium, the environmental conditions within which the image forming device is being operated, or in which the output image receiving medium may have been stored, manipulated DFE or TRC adjustments, and/or other parameters, may be deposited on the output image receiving medium. Operation of the method continues to step S2000.

It should be appreciated that an objective of the light toner dusting, is to deposit on at least a portion of each output image receiving medium such a light toner dusting in an effort, particularly with regard to lightweight output image receiving media, to reduce electrostatic forces acting upon the image receiving media and/or to provide a mechanical lubrication to the surface of the output image receiving media to facilitate an ability of the output image receiving media to remain flat as necessary through the image forming process, and specifically to better conform the output image receiving medium to the photoreceptor device in, for example, the electrostatic image forming device. Such background adjustment and/or light toner dusting may be most advantageously visually imperceptible yet provide ample opportunity for either or both of the above physical effects to reduce deviations and/or distortions in the images produced on the output image receiving medium.

While the above discussion references user manipulation, or automated manipulation, of toner reproduction curves (TRCs) in the digital front end (DFE) of an electrostatic image forming device, or otherwise manipulation of, for example, intensity of the cleaning field in such an image forming device, systems and methods according to this disclosure are not intended to be limited to such applications. It is envisioned that virtually any manner by which some adjustment may be made to enhance toner deposition on an output image receiving media that will result in deposition of a substantially non-visually perceptible toner dusting in non-image areas of the output image receiving medium may be employed.

In step S2000, the input and/or stored image obtained in step S1100 above is produced and/or reproduced on the background-adjusted or non-background-adjusted output image receiving medium. Operation of the method continues to step S2100.

In step S2100, the input image information and/or composite image information may be optionally stored to one or more beneficial purposes. Such beneficial purposes may include, but are not limited to, automated composite image review in order, for example, to determine and/or update predetermined, precomputed and/or pre-stored automated adjustments for modifying the TRCs and/or intensities of the cleaning fields such that steps in the above-identified analysis and adjustment process may be further automated. A feedback loop with such information can also be incorporated in two common (but not limiting) automation modes: 1) as a lo frequency calibration scheme to insure toner dusting is below visible levels or 2) as a in-line close loop system where printing device continuously adjusts TRC parameters based on feedback from composite image information gathered in step S2100. Operation of method continues to step S2200.

In step S2200, an output image receiving medium, with an input image, and/or background-adjusted composite image, produced and/or reproduced thereon, is output from the image forming device. Operation of the method continues to step S2300, where operation of the method ceases.

It should be appreciated that, although discussed above as a series of sequential steps, where appropriate, one or more of the above-identified steps may occur simultaneously, or nearly simultaneously, and the order of such steps is not necessarily determinitive based on the depiction in FIG. 1 or the description of the above exemplary embodiment of the method according to this disclosure. This is particularly the case regarding depositing of a background light toner dusting, where applicable, and the input image on the output image receiving medium. These steps may occur sequentially, simultaneously or substantially simultaneously depending on an actual nature of, for example, a specific photoreceptor unit in an electrostatic image forming device. Exemplary implementations of such steps may be in devices having an ability to deposit one or multiple colors of toner on an output image receiving medium on, for example, a single pass or multiple passes of the photoreceptor device over the output image receiving medium.

Figure 2:
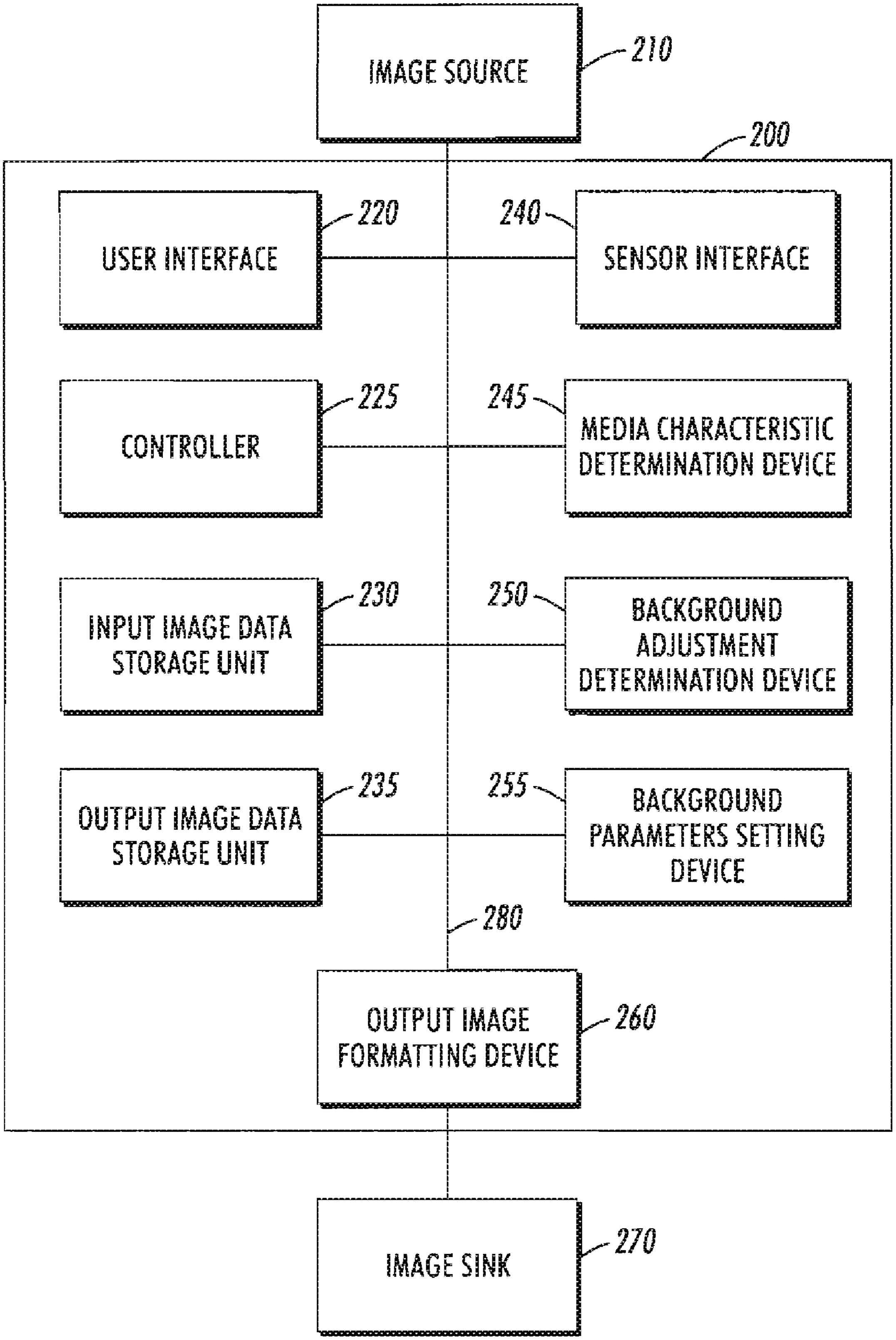
FIG. 2 illustrates an exemplary embodiment of a system for improving image formation on an output image receiving medium in an image forming device based on a characteristic of the output image receiving medium.

FIG. 2 illustrates a functional block diagram of an exemplary embodiment of a system for improving image formation on an output image receiving medium in an image forming device based on a characteristic of the output image receiving medium. As shown in FIG. 2, exemplary system 200 may include an image source 210, user interface 220, a controller 225, an input image data storage unit 230, an output image data storage unit 235, a sensor interface 240, a media characteristic determination device 245, a background adjustment determination device 250, a background parameter setting device 255, an output image formatting device 260, and an image sink 270, all connected via a data/control bus 280.

In various exemplary embodiments of disclosed systems and methods, an input image may be obtained via an image source 210. The image source 210 may be any form of image receiving and/or image forming device such as, for example, an image scanning device, an image digital data storage device, a digital still or video camera, and/or a locally or remotely located computer and/or data manipulation workstation, or any other now known or later-developed device that is capable of generating or reproducing electronic digital source image data. The image source 210 may be integrated with, or connected remotely to, the exemplary image forming device 200. The image source 210, if a separate device or unit from the image forming device 200, may be connected to the image forming device 200 by either a direct or network data communication link, including any one or more of a wired, wireless and/or optical link.

It should be appreciated that, although the image forming device 200 may be discussed as an electrographic and/or xerographic image forming device for translating image data from an image source to an image sink, this disclosure is not limited to only such an application.

The image source 210 may include a capability to store input image data. Alternatively, as depicted in FIG. 2, the image forming device 200 may internally store input image data in, for example, an input image data storage unit 230.

A user interface 220 may be provided in the form of, for example, a graphic user interface associated with the image forming device, in order, where appropriate, to query a user, and/or receive user input, regarding variable parameters for adjustment of operating parameters within the image forming device 200 that may facilitate improved image production and/or reproduction across a broad array of output image receiving media based on sensed and/or otherwise input characteristics of such output image receiving media.

It should be appreciated that the user interface 220 may also comprise, for example, a digital data storage medium and compatible digital data storage medium reading device, or, for example, a locally or remotely located computer or other data workstation that may be in data communication with the exemplary image forming device 200.

A controller 225 may be provided to control overall operations of the image forming device 200, or otherwise to specifically control only sensed characteristics and/or input characteristics regarding a particular output image receiving medium, to query databases stored within one or more data storage units, and/or to carry out operations based on determinations made in other units within the system.

A sensor interface 240 may be provided by which to automatically determine characteristics of either an output image receiving medium or an environment within which the image forming device is being operated. An objective of such sensing is to, in an automated manner, provide input for determining whether background adjustment may be warranted in order to support improved image production and/or reproduction capability from the image forming device 200 based on sensed characteristics of an output image receiving medium, or the environment within which the image forming device is being operated. Any manner of sensor by which, for example, composition of and/or characteristics of an output image receiving medium may be sensed, or other environmental conditions of the operating environment within which the image forming device is placed, are contemplated.

Data storage units such as those depicted as an input image data storage unit 230 and an output image data storage unit 235 may be provided additionally to store, for example, preset toner reproduction curves that the image forming device 200 may refer to in producing and/or reproducing color images on output image receiving media. Additionally, storage space for other operating parameters of the image forming device 200 may be provided, in addition to storage space for, for example, a database including certain predetermined parameters for adjusting a background on an output image receiving medium based on a characteristic of the output image receiving medium in the image forming device 200.

A media characteristic determination device 245 may be provided to receive input, for example, from a sensor interface 240 or a user interface 220, or to otherwise reference data stored within any manner of data storage device in order to determine such characteristics of, for example, an output image receiving medium that may affect the quality of an image produced or reproduced thereon.

A background adjustment determination device 250 may be provided to determine, based on sensed characteristics from other units and/or devices within the image forming device 200, optionally in conjunction with pre-stored or predetermined information regarding characteristics of certain output image receiving media, whether it would be advantageous and/or beneficial to adjust a background to be deposited on the output image receiving medium. A specific example of such background adjustment would be determining that a light toner dusting may be appropriately applied to, for example, a lightweight output image receiving medium in such a manner as may support improved image formation on such a lightweight output image receiving medium.

A background parameter setting device 255 may be provided to receive, for example, via a user interface, user adjustments to operational characteristics of the image forming device to specify characteristics of a background adjustment. Such characteristics may include, for example, an amount and color of a light toner dusting to be applied in at least non-image areas, particularly non-image border areas of, for example, a lightweight output image receiving medium in order to reduce, for example, electrostatic forces acting thereon, and/or to provide surface lubrication for the output image receiving medium, to enable such lightweight output image receiving medium to better conform to image receiving medium handling paths and/or photoreceptor devices within the image forming device.

An output image formatting device 260 may be provided to simply produce and/or reproduce output color images based on input images received from the image source 210 on individual output image receiving media in a format particularly suited to one or more characteristics of the output image receiving media. Such output image formatting may include, for example, formatting a composite image including a light toner dusting, that may not be visually perceptible, to facilitate improved image formation on, for example, lightweight output image receiving media.

The systems and methods according to this disclosure contemplate an image sink 270 being an output image receiving medium, particularly a lightweight output image receiving medium upon which a hard-copy image may be formed. Other image sinks 270, however, to include, for example, a digital display for review of a composite image. particularly associated with potential user adjustment of certain operating parameters, may be employed.

It should be appreciated that, given the required inputs, software algorithms, hardware/firmware circuits, or any combination of software, hardware and/or firmware control elements may be used to implement the individual devices and/or units in the exemplary image forming device 200.

Any of the data storage units depicted, or alternatively described above, may be implemented using an appropriate combination of alterable, volatile or non-volatile memory, or non-alterable, or fixed, memory. The alterable memory, whether volatile or non-volatile, may be implemented using any one or more of static or dynamic RAM, or for example, any computer-readable disk type media and compatible disk drive, a hard drive, a flash memory, or any other like memory medium and/or device. Similarly, the non-alterable or fixed memory may be implemented using any one or more ROM, PROM, EPROM, EEPROM, optical ROM disk, such as, for example, CD-ROM or DVD-ROM disk and compatible disk drive, or any other like memory storage medium and/or device.

The computations necessary to set the color depth range is preferably implemented on a programmed general purpose computer. However, the implementation can also be performed on a special purpose computer, a programmed microprocessor or microcontroller and peripheral integrated circuit elements, and ASIC or other integrated circuit, a hardwired electronic or logic circuit such as a discrete element circuit, a programmable logic device such as a PLD, PLA, FGPA or PAL or the like. While this proposal has been described with specific embodiments thereof, it is evident that many alternatives, modifications and variations will be apparent to those skilled in the art. Accordingly, the preferred embodiments of this invention as set forth herein are intended to be illustrative, not limiting.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. These and other features and advantages of this proposal are described or are apparent from the above detailed description of the preferred embodiments. Various changes may be made without departing from the spirit and scope of this invention as defined in the following claims.

What is claimed is:

1. A method for improving image quality of output images from an image forming device, comprising:

obtaining an input image in an image forming device;

determining at least one characteristic of an image receiving medium in the image forming device;

automatically assessing whether background adjustment is warranted based on the determined at least one characteristic of the image receiving medium in the image forming device;

depositing adjusted background materials on the image receiving medium based on the assessment; and producing an output image, based on the input image, on the background adjusted image receiving medium in the image forming device.

2. The method of claim 1, wherein the determined at least one characteristic of the image receiving medium is at least one of a thickness or weight of the image receiving medium.

3. The method of claim 2, wherein the at least one of a thickness or weight of the image receiving medium is measured to be at least one of less than or equal to 60 gsm with uncoated finish or 90 gsm with coated finish or with stiffness as measured by bending moment to be <1.0 gram-cm.

4. The method of claim 1, wherein the determining the at least on characteristic is accomplished through input from one or more sensors associated with the image forming device.

5. The method of claim 1, wherein the determining the at least on characteristic is obtained through user input.

6. The method of claim 1, further comprising obtaining parameters for the adjusted background based on the at least one characteristic of the image receiving medium;

wherein adjusted background materials are deposited based on the obtained parameters.

7. The method of claim 6, wherein the parameters are obtained by querying a stored database of parameters related to characteristics of image receiving media employed by the image forming device.

8. The method of claim 6, wherein the parameters are obtained through user input.

9. The method of claim 1, wherein the adjusted background materials to be deposited on the image receiving medium are toner particles.

10. The method of claim 9, wherein depositing the adjusted background materials comprises providing a light dusting of toner particles on the image receiving medium.

11. The method of claim 10, wherein at least one of the position, color and intensity of the light dusting of toner particles is user selectable.

12. The method of claim 10, wherein the light dusting of toner particles is provided on an entire surface of the image receiving medium.

13. The method of claim 10, wherein the light dusting of toner particles is provided only in non-image areas on the surface of the image receiving medium.

14. The method of claim 10, wherein the light dusting of toner particles is visually imperceptible.

15. The method of claim 10, wherein a color of the light dusting of toner particles is selected based on at least one of characteristics of the image receiving medium or a characteristic of the input image.

16. The method of claim 15, wherein an intensity of the light dusting of toner particles may be selected by referencing a stored database that provides a mapping between each of acceptable background toner colors and corresponding background toner perceptibility thresholds.

17. The method of claim 16, further comprising at least one of inputting a background toner perceptibility threshold table through a user interface or storing the background toner perceptibility threshold table for reference in the image forming device.

18. The method of claim 9, wherein the image forming device is an electrographic image forming device and background adjustment is undertaken through manipulation of a toner reproduction curve in the image forming device.

19. The method of claim 9, wherein the image forming device is an electrographic image forming device and background adjustment is undertaken through manipulation of a cleaning field intensity in the image forming device.

20. A computer-readable data storage medium on which is stored a program for causing a computer associated with an image forming device to implement the method of claim 1.

21. A system for improving image quality of output images from an image forming device, comprising:

an image source that provides an input image to an image forming device;

a media characteristic determination device that determines at least one characteristic of an image receiving medium in the image forming device;

a background adjustment determination device that automatically assesses whether background adjustment is warranted based on an input from the media characteristic determination device;

an output image formatting device that deposits adjusted background materials on the image receiving medium based on an input from the background adjustment determination device, and formats an output image, based on the input image, on the background adjusted image receiving medium in the image forming device.

22. The system of claim 21, wherein the determined at least one characteristic of the image receiving medium is at least one of a thickness or weight of the image receiving medium.

23. The system of claim 22, wherein the at least one of a thickness or weight of the image receiving medium is measured as being at least one of less than or equal to 60 gsm with uncoated finish or 90 gsm with coated finish or with stiffness as measured by bending moment to be <1.0 gram-cm.

24. The system of claim 21, further comprising one or more sensors that provide input regarding the at least on characteristic of the image receiving medium.

25. The system of claim 21, further comprising a user interface that allows a user to input data regarding at least one of the at least on characteristic of the image receiving medium or parameters for the adjusted background.

26. The system of claim 21, wherein the adjusted background materials to be deposited on the image receiving medium are toner particles.

27. The system of claim 26, wherein the adjusted background materials are provided in the form of a light dusting of toner particles on at least a portion of the image receiving medium.

28. The system of claim 26, wherein at least one of the position, color and intensity of the light dusting of toner particle is user selectable.

29. An image forming device including the system of claim 21.

30. A xerographic image forming device including the system of claim 21.

* * * * *